United States Patent
Kranz et al.

(10) Patent No.: US 9,661,064 B2
(45) Date of Patent: May 23, 2017

(54) SYSTEMS AND METHODS FOR DEPLOYING LEGACY SOFTWARE IN THE CLOUD

(71) Applicant: CA, Inc., Islandia, NY (US)

(72) Inventors: Kenneth James Kranz, Sayville, NY (US); George Curran, Islandia, NY (US)

(73) Assignee: CA, Inc., Islandia, NY (US)

( * ) Notice: Subject to any disclaimer, the term of this patent is extended or adjusted under 35 U.S.C. 154(b) by 279 days.

(21) Appl. No.: 14/163,960

(22) Filed: Jan. 24, 2014

(65) Prior Publication Data

US 2015/0215376 A1    Jul. 30, 2015

(51) Int. Cl.
  *H04L 29/08* (2006.01)
  *H04N 21/443* (2011.01)
  *G06F 9/455* (2006.01)

(52) U.S. Cl.
  CPC .......... *H04L 67/10* (2013.01); *G06F 9/45533* (2013.01); *G06F 9/45558* (2013.01); *H04N 21/4431* (2013.01)

(58) Field of Classification Search
  CPC .. G06F 8/60; G06F 17/3056; G06F 17/30575; G06F 21/105; G06F 9/45533; G06F 9/45558; H04L 41/12; H04L 47/78; H04L 47/827; H04L 63/104; H04L 67/141; H04M 3/5231; H04W 4/12; H04N 21/4431
  See application file for complete search history.

(56) References Cited

U.S. PATENT DOCUMENTS

| | | | | |
|---|---|---|---|---|
| 2011/0271278 A1* | 11/2011 | Dittrich | ..................... | G06F 8/60 718/1 |
| 2012/0321070 A1* | 12/2012 | Smith | ................. | H04M 3/5231 379/265.09 |
| 2013/0081109 A1* | 3/2013 | Venkataraman | .... | G06F 17/3056 726/4 |
| 2013/0297655 A1* | 11/2013 | Narasayya | ........ | G06F 17/30575 707/791 |
| 2014/0075565 A1* | 3/2014 | Srinivasan | ............ | H04L 63/104 726/26 |
| 2014/0273994 A1* | 9/2014 | Upendran | ............... | H04W 4/12 455/414.1 |
| 2014/0280948 A1* | 9/2014 | Schmidt | ................ | H04L 47/827 709/226 |

(Continued)

*Primary Examiner* — Le Luu
(74) *Attorney, Agent, or Firm* — Gilliam IP PLLC

(57) ABSTRACT

A system, method, apparatus and computer program product is described to provide a plurality of connectors, the connectors configured to support one or more applications in at least one configuration selected from a group of configurations including: i) a non-tenant, and non-tenant aware, application, ii) a non-tenant, but tenant aware, application, iii) a many tenant application, iv) a multi-tenant application, and v) a native multi-tenant application. Also provided are one or more application programming interfaces (APIs) to the connectors, the one or more APIs providing a substantially uniform interface to applications supported by the connectors. In one embodiment, a governance layer provides the APIs, and the governance layer communicates with the connectors, so that an application's tenancy support is obfuscated.

15 Claims, 7 Drawing Sheets

(56) References Cited

U.S. PATENT DOCUMENTS

| | | | |
|---|---|---|---|
| 2015/0082301 A1* | 3/2015 | Garg | H04L 41/12 718/1 |
| 2015/0207758 A1* | 7/2015 | Mordani | H04L 47/78 709/226 |
| 2015/0222638 A1* | 8/2015 | Morley | G06F 21/105 726/28 |
| 2016/0014212 A1* | 1/2016 | Zhang | H04L 67/141 709/226 |

* cited by examiner

SYSTEMS AND METHODS FOR DEPLOYING LEGACY SOFTWARE IN THE CLOUD

TECHNICAL FIELD

This application relates generally to cloud based data processing, and more specifically to systems and methods for deploying legacy software in the cloud.

BACKGROUND

Cloud computing is a fast growing technology trend, due to the many advantages it offers. While many new applications are designed to natively operate in a cloud environment, there remains a vast trove of legacy software not natively adapted for the cloud environment. Still, many enterprises nonetheless desire to move this legacy software to the cloud.

BRIEF DESCRIPTION OF THE DRAWINGS

Some embodiments are illustrated by way of example and not limitation in the figures of the accompanying drawings in which.

DETAILED DESCRIPTION

The cloud, and its related topic of tenancy, is a fairly new concept. Moreover, the understanding of what constitutes "the cloud" and "cloud services" varies among information technology workers. For the purposes of this application, it shall be understood that "cloud computing" involves providing software as a service over the cloud. More particularly, cloud computing is the use of computing resources (hardware and software) that are delivered as a service over a network (typically the Internet). Cloud computing entrusts remote services with a user's data, software and computation. While, in many cases software will be written from scratch to service cloud needs, given the large body of existing software applications, the ability to expose this "legacy" software in cloud form is vital. This view is currently provided haphazardly, for example with custom implementations for each application.

Illustrated in the various figures, and described herein below, are methods, systems, apparatus and computer products to provide software components and architecture to support cloud services to expose non-cloud software in the cloud through one or more uniform application programming interfaces (API's). According to one example embodiment, the APIs are provided to support cloud services so that the underlying applications tenancy support can be obfuscated. For example, these embodiments expose non-tenant based and pass-through tenant based applications to the cloud, so as to give the appearance of tenancy support across a spectrum of non-cloud and native cloud software applications. In one embodiment, these cloud services are supported by servers located at a data center, which may for example include a server farm and administrative software that supports the provisioning, operation and maintenance of software applications on the servers.

Figure 1:
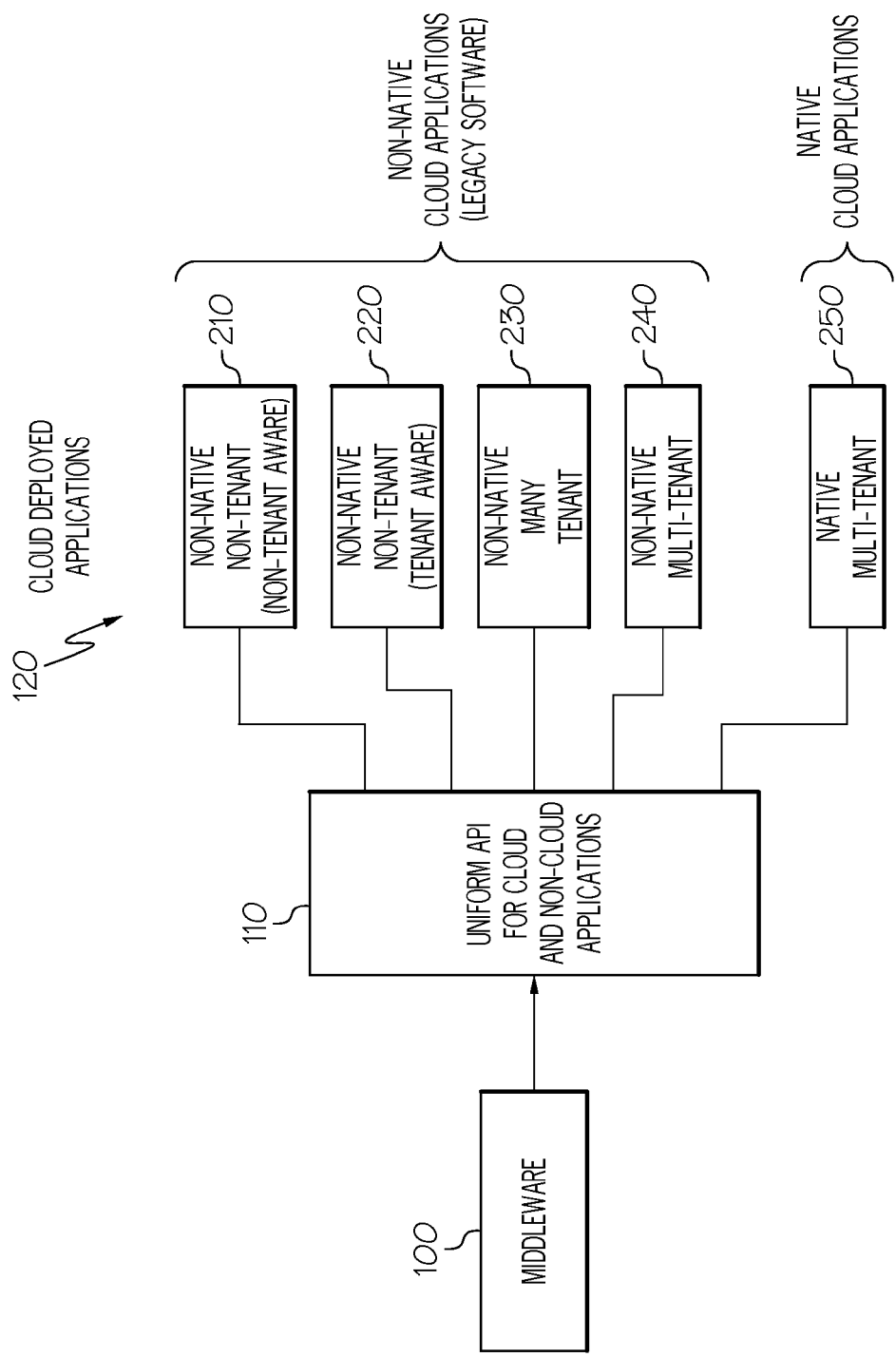
FIG. 1 illustrates a simplified block diagram of cloud-based deployment of legacy and native applications according to an example embodiment.

As illustrated in the system of FIG. 1, there is provided one or more uniform API's 110 to a plurality of tenant applications executing on computing platforms operating in the cloud 120. As described in more detail below, the pseudo-tenant or tenant applications deployed in cloud 120 may be heterogeneous and include a non-tenant, and non-tenant aware, application 210, a non-tenant, but tenant aware, application 220, a many tenant application 230, a multi-tenant application 240, and a native multi-tenant application 250. According to one example embodiment, the API's 110 are exposed to middleware 100.

Cloud 120 is, in one example embodiment, deployed in one more data centers, wherein each data center is a facility used to house and manage computer systems, and in particular computer servers, and associated components, such as telecommunications and storage systems. A data center generally includes redundant or backup power supplies, redundant data communications connections, environmental controls (e.g., air conditioning, fire suppression) and security devices. Data center infrastructure management, in one embodiment, includes a data center management platform that includes software applications that centralize monitoring, management and intelligent capacity planning of a data center's critical systems, enabling common, real-time monitoring and management for all interdependent systems across the data center.

According to one example embodiment described herein, the interface components and layers described herein expose non-cloud applications (i.e., applications not natively adapted for use in cloud deployment) as if they were designed specifically for the cloud. In addition, in some example embodiments, IP restrictions may be provided on the class of exposed APIs that assist in avoiding malfunctions of non-cloud software deployed on the cloud.

Figure 2:
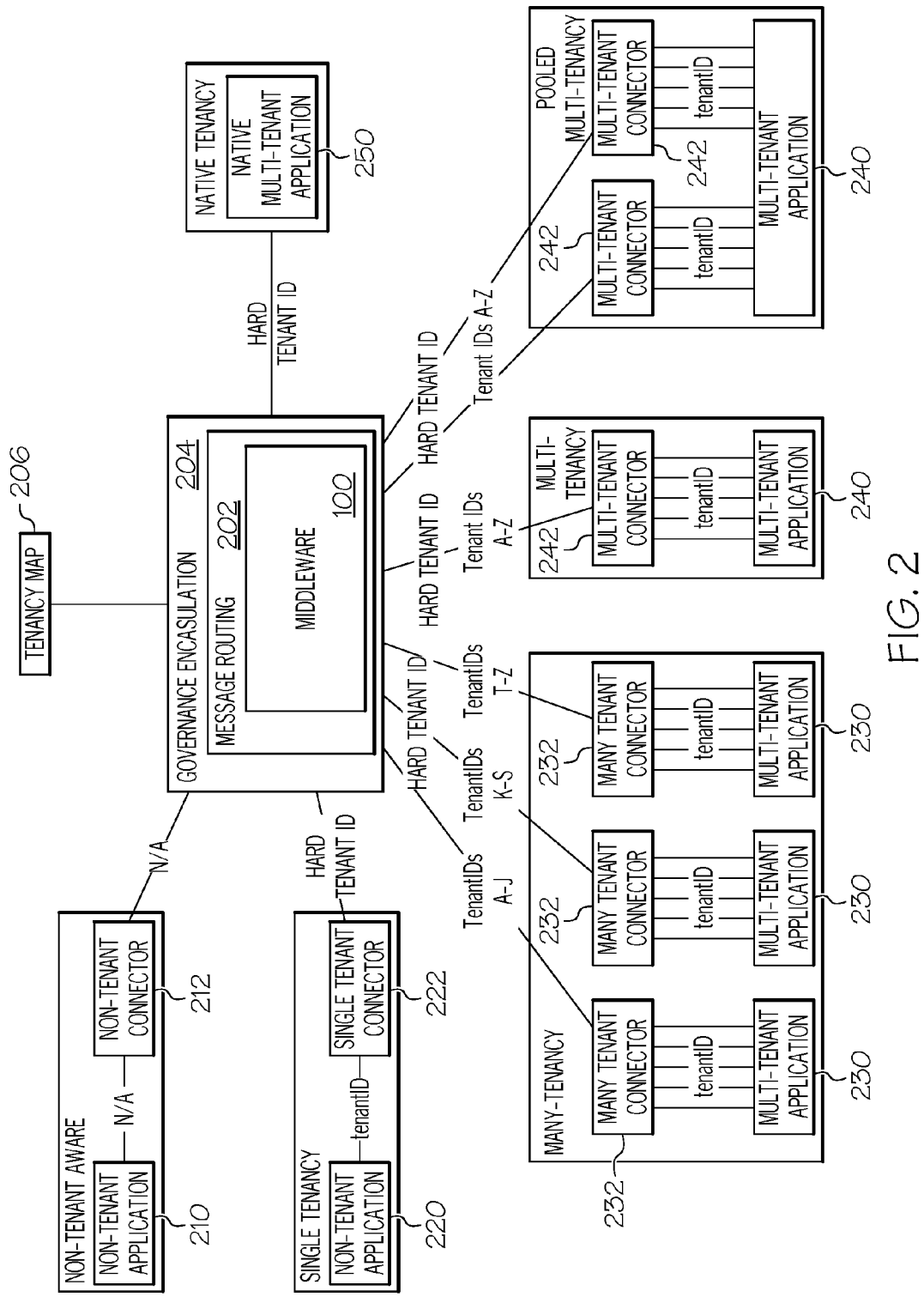
FIG. 2 illustrates a software architecture diagram of cloud-based deployment of legacy and native applications according to an example embodiment.

As illustrated in FIG. 2, there is shown cloud support connectors, components and architectures for cloud/tenancy categories to address respective different types of applications that, as capable, may message with and between each other through, for example, middleware 100, message routing layer 202, and governance encapsulation layer 204, wherein layers 202 and 204 are implemented, for example, with one or more software components. A tenancy map broker 206 provides for assigning and managing tenancy information, including for example tenant ID's.

According to one example embodiment, middleware 100 may be software that enables communication and management of data in distributed applications. Middleware 100 can be, for example, any software layer that lies between an operating system and/or applications on each side of a distributed computing system in a network. Services that can be regarded as middleware, for example and without limitation, include enterprise application integration, data integration, message oriented middleware (MOM), object request brokers (ORBs), and the enterprise service bus (ESB). The distinction between operating system and middleware functionality is, to some extent, arbitrary. While core kernel functionality can only be provided by the operating system itself, some functionality previously provided by separately sold middleware is now integrated in operating systems. A typical example is the TCP/IP stack for telecommunications, nowadays included in virtually every operating system.

Message routing layer 202, supports the process of selecting paths in a network along which to route or send network traffic. Governance encapsulation layer 204 provides for encapsulating various capabilities for communicating, interacting and controlling the various pseudo-tenant or tenant applications 210, 220, 230, 240, 250 and 260 through the connectors described below, or by direct connection in the case of application 270, for example by bundling data with methods (or other functions) operating on that data, and/or restricting access to some of the applications' components. Governance encapsulation layer 204 and the various associated connectors 212, 222, 232 and 242, provides a set of uniform API's that can be used by middleware 100 to interact with the various tenant applications through respective connectors, as described below in more detail.

Not Tenant Aware Connector.

A non-tenant and non-tenant aware application 210, shown connected to a Non Tenant Aware (NTA) Connector 212, is not aware of tenancy, and moreover, is not considered a suitable application to engage in cloud based message flow. Consequently, in order to project the concept of tenancy for this category of application (to provide pseudo-tenancy), a new instance of the underlying application must be installed—one instance for each tenant. The connector 212 is configured to accept one and only one tenant definition. A separate process, beyond the routing and governance layers 202 and 204, is provided for creating the new application instances, renaming instances, or deleting tenant instances.

While an application might be defined as inherently "not tenant aware" it does not mean that it would not be of value to a cloud based service. For example, a software service to format business cards would not require details on tenancy/sub-tenancy ownership, yet it would still be of value to deploy as a cloud service. According to one example embodiment, tenancy records sent to a Non Tenant Aware (NTA) Connector 212 can be processed, but they can never be shared between tenants or subtenants. As illustrated, non tenant connector 212 is not assigned a tenant ID, as it is unable to share tenancy records with other tenant application.

The connector 212, in this example embodiment, presents a layer to the cloud service offered by governance layer 204, that enables the routing and processing of requests to such single use application 210. For example, a request to create a new tenant will result in the generation of a work-flow request. Conversely, a request to get or put data to an "existing" tenant will result in the necessary routing to the installed instance and the removal of the tenancy related data on the down-stream flow and the subsequent addition of tenancy records on the upstream flow, by connector 212.

The mappings associated with this type of connector include:
Inbound: platform tenant→null
Outbound: null→platform tenant Alternatively, the application 210 served by connector 212 can handle the concept of a single tenancy in that it will generate a parallel instance of the application—e.g., local data store, in memory objects, new database schema or tables—as needed. This alternate embodiment of connector 212 differs in that the process of creating new tenant instances and/or the need to manage tenant renaming and deletions is not required at the connector level. This functionality is, instead, replaced with API calls made available in the governance layer 204 to manage this process. Despite this level of automation, the underlying application 210 still lacks tenancy knowledge. Consequently, a mapping process must still be supported by the connector. The mappings associated with this alternative embodiment of connector 212 are:
Inbound: platform tenant→null
Outbound: null→platform tenant Single Tenant Connector A single tenant connector 222 is placed in front of a software application 220 that can consume tenancy information. Typically this tenancy definition is an extension of an existing (historic) group specification. In effect, the group specification is being overridden to act as a tenant indicator. The Single Tenant Connector 222 must route messages such that the proper platform tenant ID is transmitted to the specific hosted service. A hard tenant ID 224 provides a routing path to connector 222. The mappings associate with this type of tenancy support are as follows:
Inbound: platform tenant→group ID
Outbound: group ID→platform tenant Many Tenant Connector The many tenant connector 232 is associated with a software application 230 that is, effectively, multi-tenant with the addition of restrictions on how many, and which tenants, are allowed on a particular node. The many tenant connector 232 is designed to allow multiple instances of a multi-tenant application—applications which for either performance or deployment reasons cannot be spread across more than one active node. A plurality of hard tenant IDs A-Z provide routing to and from respective many tenant connectors 232.

Mapping for the many tenant connector, are as follows. Assuming a tenant community of tenants T1 . . . T10 and a tenant sub-community of T1 . . . T10 on a particular server, the mappings include:
Inbound: platform tenants platform tenants T1 . . . T10→local tenants t1' . . . t10'
Outbound: local tenants t1' . . . t10'→platform tenants T1 . . . T10

Multi-Tenant Connector

A multi-tenant connector 242 is used to front end an application 240 that fully supports tenancy. Consequently, since the application is capable of managing multi-hosted deployments, no mappings within the connector 242 is required. This type of connector 242 would exist simply to provide a pass-through set of APIs to ensure a common interface façade. Alternatively, multiple connectors 242 are used to connect to a single multi-tenant application 243. A plurality of hard tenant IDs A-Z provide routing to and from respective many tenant connectors 242 and 243. Due to full support of tenancy, no mapping is required through the connectors 242 and 243.

Native Tenancy—No Connector

A tenant application 250 that natively supports tenancy may be deployed in this architecture without any connector. A hard tenant ID provides routing to native tenant application 250.

According to one example embodiment, the set of connectors and corresponding APIs supported by governance layer 204 include all of the above-described connectors and corresponding supporting APIs, or additional connectors and APIs. In another embodiment, two different ones of the connector and supporting APIs described above are provided. In still other embodiments, any combination of three or more of the above described connectors and supporting APIs are provided.

Figure 3:
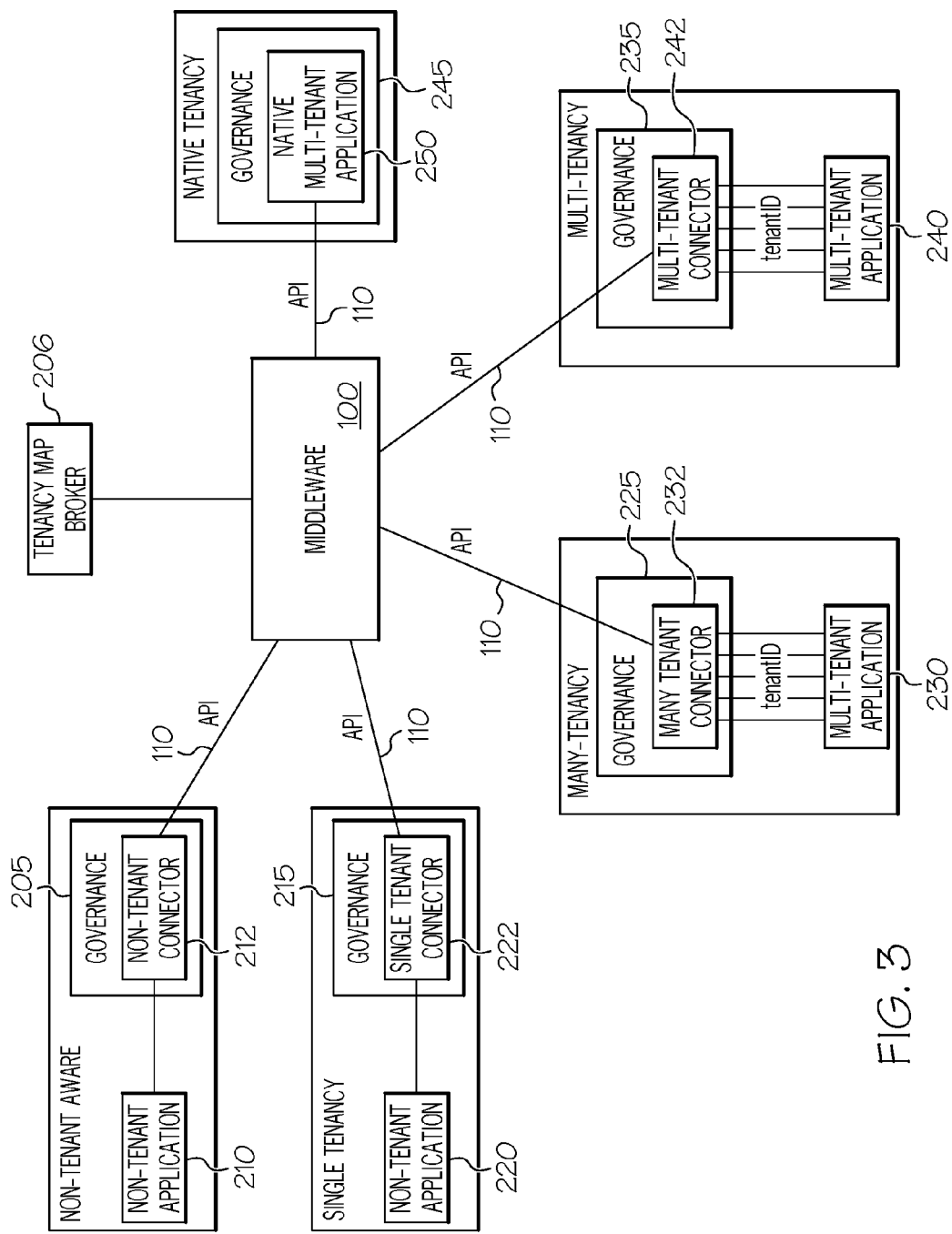
FIG. 3 is an alternative embodiment of a software architecture diagram of cloud-based deployment of legacy and native applications.

Referring now to FIG. 3, there is illustrated an alternate embodiment, wherein message routing layer 202 and governance encapsulation layer 204 (also referred to as "governance layer") are distributed away from middleware 100 to each connector 212, 222, 232, 242, and 252. Governance layers 205, 215, 225, 235 and 245 provide distributed governance functionality. In this embodiment, the respective connectors and middleware 100 are exposed to each other as node API's.

Figure 4A:
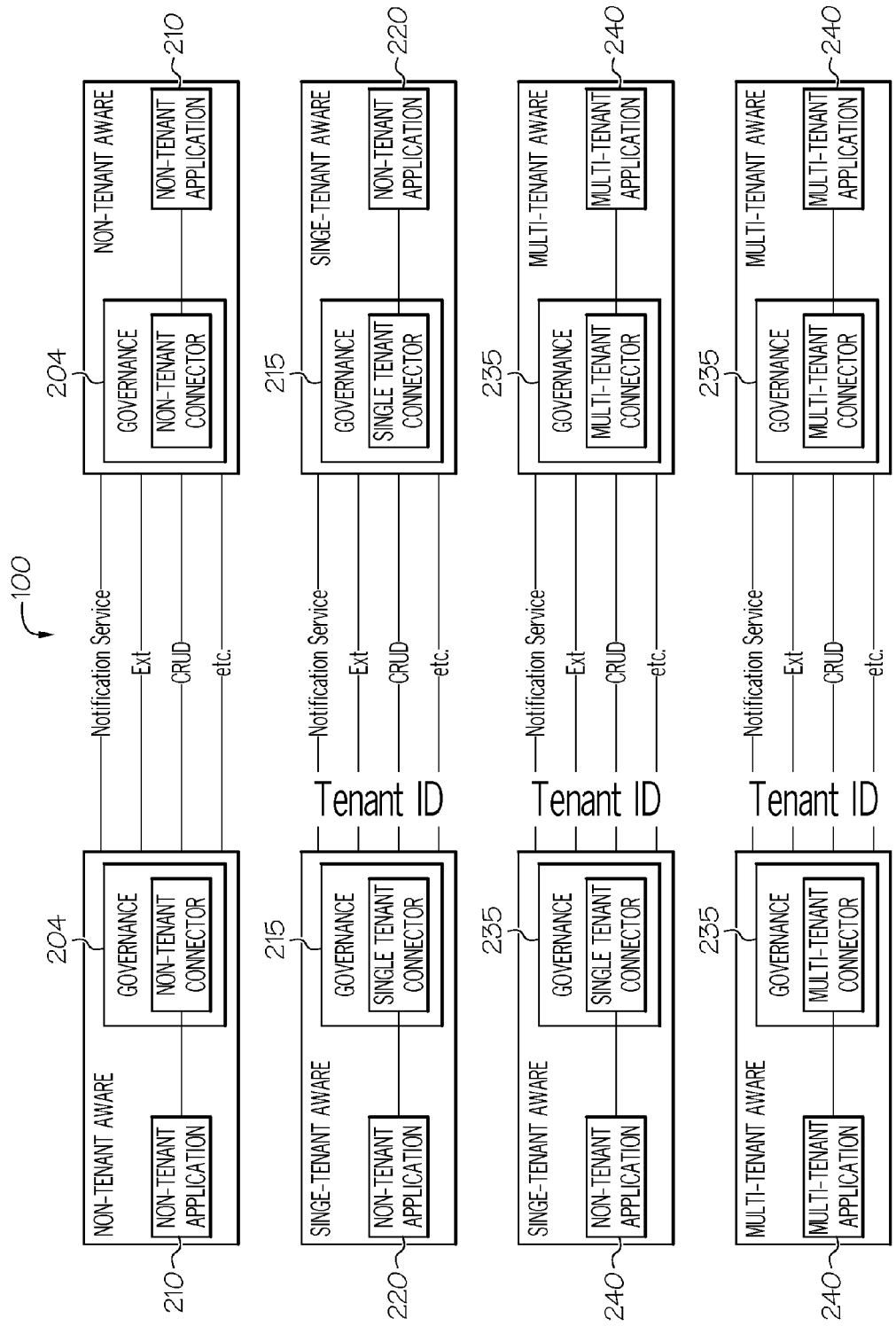
FIGS. 4A, 4B, 4C and 4D are diagrams of API's and methods for a cloud-based deployment of legacy and native applications according to an example embodiment.

Referring now to FIG. 4A, there is illustrated in more detail various examples of methods of communication with and between non tenant aware application 210 and tenant aware applications 220, 230 and 240, through the connectors 212, 222, 232 and 242, and associated layers. Each node API supports, for example, a notification service, an ext service, CRUD (create, retrieve, update and delete) database functions, other functions (etc.), and custom operations. Tenant ID's are used to route the API services to the various respective connectors.

Figure 4B:
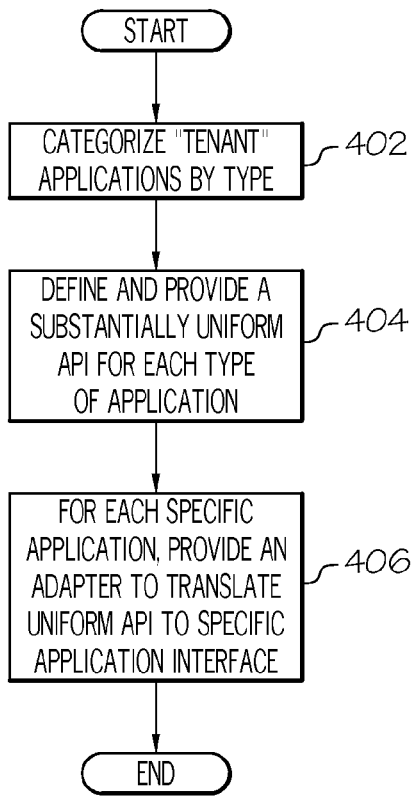
Figure 4C:
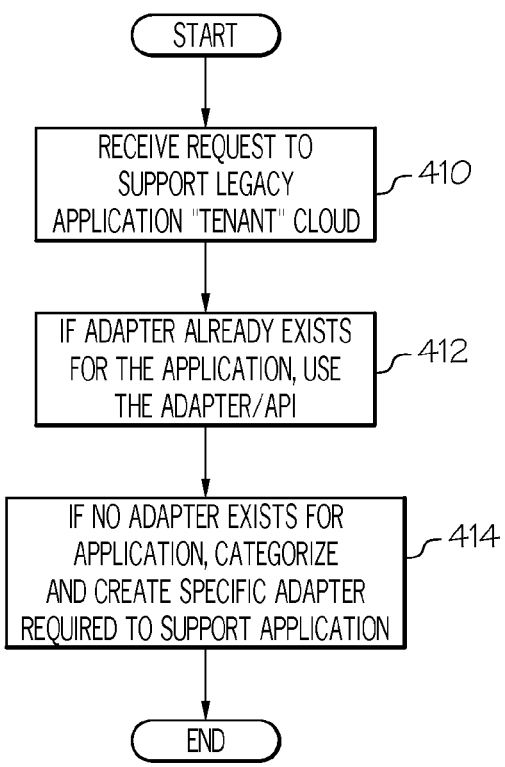

FIGS. 4B and 4C illustrate example methods and operation of the systems and software described herein. According to one example embodiment, FIG. 4B illustrates a process for deploying legacy and native tenant applications in the cloud. As described above, legacy applications are categorized (402) by type, such as but not limited to non-tenant, and non-tenant aware, applications, non-tenant, but tenant aware, applications, many tenant applications, multi-tenant applications, and native multi-tenant applications. For each type of "tenancy" application, a substantially (or completely) uniform API is defined (404) for programmatically interacting with the respective type tenant application. For each specific tenant application of each type that needs to be deployed, there is provided an connector to translate (406) the uniform API provided for its type of application to the specific interface requirements of the particular application. Accordingly, interaction with each particular type of tenant application supported by the respective API's is made uniform, particularly such that the specific interface requirements of the supported tenant applications are obfuscated to external systems or processes. According to one embodiment, a separate connector may be provided for each specific tenant application to be supported in the cloud, or a single connector may be provided that interfaces with more than one specific application.

According to yet another embodiment, the respective API's for each type of tenant application are further configured to be substantially uniform across all the different types (categories) of tenant applications, so that even the particular type of tenant application is obfuscated from the perspective of external applications or processes.

According to another example embodiment illustrated in FIG. 4C, a request to support (410) a legacy application in a cloud/tenancy configuration is received at a data center or other hosting facility, and the legacy application is categorized (412) by type, for example but not limited to the types hereinabove described. If the legacy application is of a kind that already has an extant connector (412) for it, then that connector, or an instance of that connector, is deployed for the legacy application, and the legacy application and the connector are accessible through the respective API for that application type, working through the respective connector. If the specific application is not supported by an extant connector (414), then an existing connector is modified, or a new connector is written, to provide the necessary interface to that application. Thereafter, the application is deployed using the new connector.

Figure 4D:
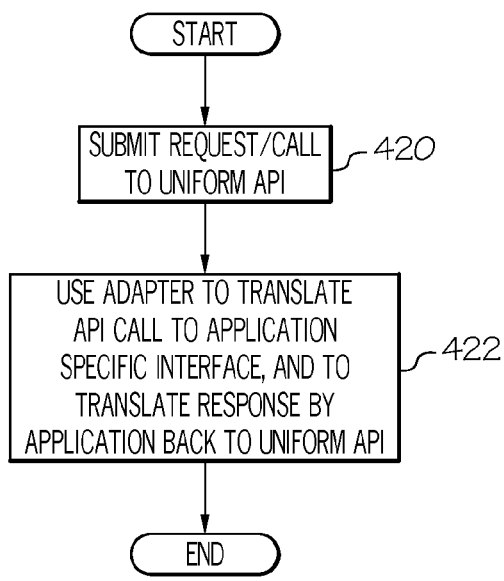

Referring now to FIG. 4D, there is illustrated the operation of a substantially uniform API to a particular type of tenant application. Requests are submitted to the API (420), using the defined substantially uniform API for that type of tenant application by requesting applications, and those requests are captured by the API and submitted to the respective connector supporting the tenant application to which the API call is directed. The connector in turn translates (422) the API call to the specific interface signals, commands or instructions, and/or data required by the specific application, and sends them to the application. In the return path, the connector translates the output of the specific application back to a form compliant with the uniform API, which in turn is used to communicate with the external application accessing the cloud supported application.

Thus, the embodiments disclosed herein provide a wide range of interface design patterns and interface capabilities, so that all applications, legacy and newly created, appear to have substantially the same level of cloud tenancy support. According to still other advantages of the embodiments described herein, over time, as an application is upgraded and makes the transition from non-cloud based to full cloud support, the API abstraction layers provided herein for supporting non-could software need not change. Consequently, existing applications are code-ready for upgrade. To support these expose applications such that there is a uniform level of cloud/tenancy support—independent of the cloud/tenancy support for any one application or appliance.

Example Platform Architecture

Figure 5:
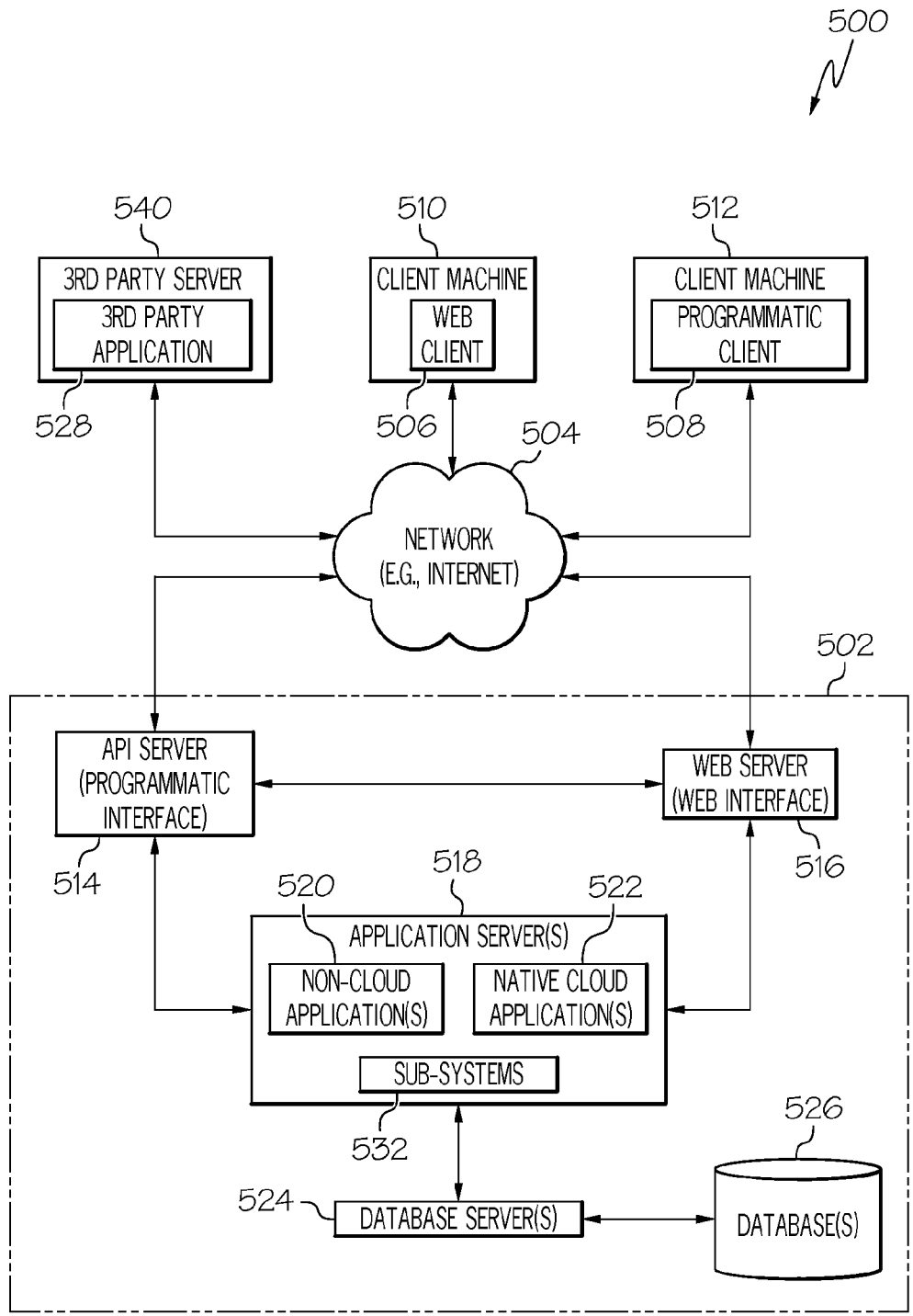
FIG. 5 is a block diagram illustrating an example embodiment of a cloud system with deployment of native and non-native applications through a uniform application programming interface.

FIG. 5 is a block diagram illustrating a network-based system 500 for deploying and/or implementing the various embodiments described herein. In an embodiment, the network-based system 500 operates in real time or near real-time. In one embodiment, the system 500 is deployed in a data center. The block diagram depicting a client-server system 500, within which an example embodiment can be deployed is described. A networked system 502, in the example forms a network-based system, provides server-side functionality, via a network 504 (e.g., the Internet or Wide Area Network (WAN)) to one or more clients 510, 512. FIG. 5 illustrates, for example, a web client 506 (e.g., a browser, such as Internet Explorer, Firefox or Chrome), and a programmatic client 508 executing on respective client machines 510 and 512. In an example, the client machines 510 and 512 can be in the form of a mobile device, such as mobile device 400.

A server 514 and a web server 516 are coupled to, and provide programmatic and web interfaces respectively to, one or more application servers 518. Server 514 hosts, in one example embodiment, one or more of middleware 100, message routing layer 202, governance layer 204, and corresponding connectors (i.e., 212, 222, 232, 242 and 252) described hereinabove, to expose API's 110 that may be programmatically accessed by client machines 510 and 512 either directly, or through web server 516. The application servers 518 host one or more non-cloud applications 520 (for example, applications 210, 220, 230, 240 and 250, native cloud applications 522, and other sub-systems 532. In one example embodiment, all or a portion of the functionality and software components of connectors 212, 222, 232, 242 and 252, routing layer 202 and governance layer 204, may be deployed on the application servers 516, instead of API server 514. The application servers 518 are, in turn, coupled to one or more database servers 524 that facilitate access to one or more databases 526. In some examples, the application server 518 can access the databases 526 directly without the need for a database server 524.

The applications 520 may provide a number of functions and services to users that access the networked system 502, as described otherwise herein. While the applications 520 and 522, and other sub-systems 532 are shown in FIG. 5 to all form part of the networked system 502, it will be appreciated that, in alternative embodiments, the applications 520 and 522 or others may form part of a service that is separate and distinct from the networked system 502.

Further, while the system 500 shown in FIG. 5 employs a client-server architecture, the present invention is of course not limited to such an architecture, and could equally well find application in a distributed, or peer-to-peer, architecture system, for example. The various applications 520, applications 522, and sub-system 532 could also be implemented as standalone software programs, which do not necessarily have networking capabilities.

The web client 506 accesses the various applications 520 and 522, and optional sub-systems 532 via the web interface supported by the web server 516. Similarly, the programmatic client 508 accesses the various services and functions provided by the applications 520 and 522 via the programmatic interface provided by the API server 514.

FIG. 5 also illustrates a third party application 528, executing on a third party server machine 540, as having programmatic access to the networked system 502 via the programmatic interface provided by the API server 514. For example, the third party application 528 may, utilizing information retrieved from the networked system 502, support one or more features or functions on a website hosted by the third party. The third party website may, for example, provide one or more functions that are supported by the relevant applications of the networked system 502.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
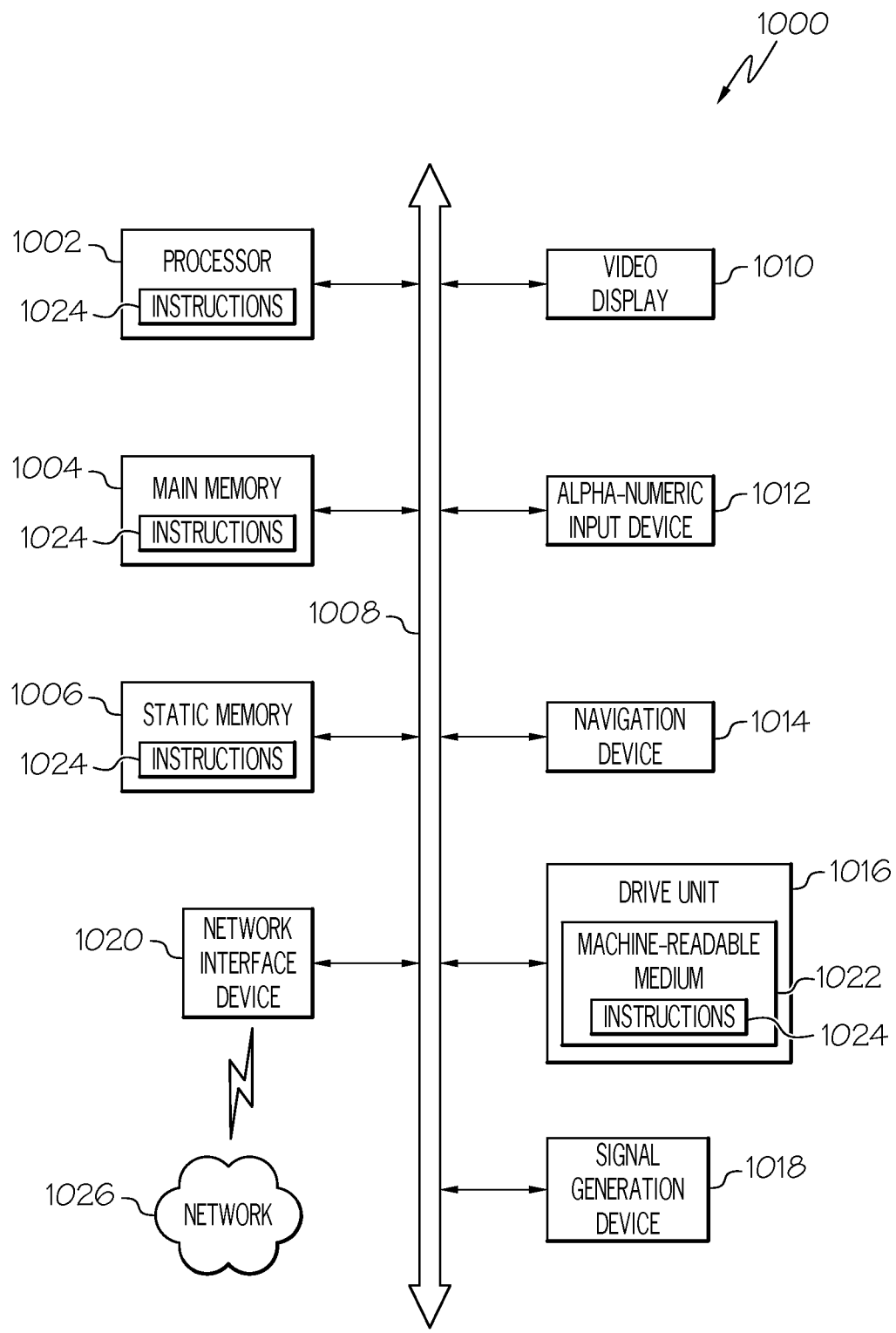
FIG. 6 is a diagrammatic representation of a machine in the example form of a computer system within which a set of instructions for causing the machine to perform any one or more of the methodologies discussed herein may be executed.

FIG. 6 is a block diagram of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or used by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for computer guided have been described. Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
    a) storing one or more computer programs on a non-transitory storage medium, the one or more computer programs operable when executed on one or more computing systems to provide:
        i) a first connector configured to deploy a first type of non-native application in a cloud environment, wherein the first type of application is a single tenant, tenant-aware application;
        ii) a second connector configured to deploy a second type of non-native application in a cloud environment, wherein the second type of application is a many-tenant, tenant-aware application; and
        iii) a third connector configured to deploy a third type of non-native application in a cloud environment, wherein the third type of application is a multi-tenant, tenant-aware application; wherein
        the first, second and third connectors each have a uniform application programming interface (API) with respect to one another; and
    b) installing a non-native application on a computer system in a cloud environment including:
        i) determining the type of the non-native application to be deployed;
        ii) based on the type, choosing a connector selected from the group of the first, second and third connectors;
        iii) installing an instance of the chosen connector on the computer system; and
        iv) installing the non-native application on the computer system so that the non-native application is accessed through the uniform API for the instance of the chosen connector.

2. The computer-implemented method of claim 1, wherein the first, second and third APIs are uniform so that the same interface is used across a variety of non-native applications deployed in the cloud environment.

3. The computer-implemented method of claim 2 further comprising:
    installing one or more computer programs to provide a governance layer to interact with the API.

4. The computer-implemented method of claim 3, wherein the governance layer communicates with the connectors, and wherein a tenancy support of the non-native application is obfuscated.

5. The computer-implemented method of claim 1, wherein for a particular one of the uniform APIs there is provided two or more different connectors, each different connector providing an interface between the uniform API and a particular different application of the type supported by the respective type of API.

6. One or more non-transitory machine-readable storage media comprising program code provide a non-native application in a cloud environment, the program code to:
    provide a first connector configured to deploy a first type of non-native application in the cloud environment, wherein the first type of application is a single tenant, tenant-aware application;
    provide a second connector configured to deploy a second type of non-native application in the cloud environment, wherein the second type of application is a many-tenant, tenant-aware application;

provide a third connector configured to deploy a third type of non-native application in the cloud environment, wherein the third type of application is a multi-tenant, tenant-aware application; wherein the first, second and third connectors each have a uniform application programming interface (API) with respect to one another; and install a non-native application on a computer system in the cloud environment, wherein the program code to install the non-native application comprises program code to:

determine the type of the non-native application to be deployed;

select, based on the type, a connector from among at least one of the first, second and third connectors;

install an instance of the selected connector on the computer system; and install the non-native application on the computer system such that the non-native application is accessed through the uniform API for the instance of the chosen connector.

7. The one or more non-transitory machine-readable storage media of claim 6, wherein the first, second and third APIs are uniform to present a same interface across a variety of non-native applications deployed in the cloud environment.

8. The one or more non-transitory machine-readable storage media of claim 7, wherein the program code comprises program code to:

install a governance layer to interact with the API.

9. The one or more non-transitory machine-readable storage media of claim 8, wherein the governance layer is configured to communicate with the connectors, and wherein a tenancy support of the non-native application is obfuscated.

10. The one or more non-transitory machine-readable storage media of claim 6, wherein for at least one of the uniform APIs two or more different connectors are provided, wherein each of the two or more different connectors are to provide an interface between the uniform API and an application of the type supported by the respective type of API.

11. An apparatus comprising:
a processor; and
a machine-readable medium having program code executable by the processor to cause the apparatus to:

provide a first connector configured to deploy a first type of non-native application in the cloud environment, wherein the first type of application is a single tenant, tenant-aware application;

provide a second connector configured to deploy a second type of non-native application in the cloud environment, wherein the second type of application is a many-tenant, tenant-aware application;

provide a third connector configured to deploy a third type of non-native application in the cloud environment, wherein the third type of application is a multi-tenant, tenant-aware application; wherein the first, second and third connectors each have a uniform application programming interface (API) with respect to one another; and install a non-native application on a computer system in the cloud environment, wherein the program code to cause the apparatus to install the non-native application comprises program code to cause the apparatus to:

determine the type of the non-native application to be deployed;

select, based on the type, a connector from among at least one of the first, second and third connectors;

install an instance of the selected connector on the computer system; and install the non-native application on the computer system such that the non-native application is accessed through the uniform API for the instance of the chosen connector.

12. The apparatus of claim 11, wherein the first, second and third APIs are uniform to present a same interface across a variety of non-native applications deployed in the cloud environment.

13. The apparatus of claim 12, wherein the program code comprises program code executable by the processor to cause the apparatus to:

install a governance layer to interact with the API.

14. The apparatus of claim 13, wherein the governance layer is configured to communicate with the connectors, and wherein a tenancy support of the non-native application is obfuscated.

15. The apparatus of claim 11, wherein for at least one of the uniform APIs two or more different connectors are provided, wherein each of the two or more different connectors are to provide an interface between the uniform API and an application of the type supported by the respective type of API.

* * * * *